US011335957B2

(12) United States Patent
Kim et al.

(10) Patent No.: US 11,335,957 B2
(45) Date of Patent: May 17, 2022

(54) CYLINDRICAL SECONDARY BATTERY HAVING HOLLOW PORTION FILLED WITH THERMAL CONDUCTIVE RESIN

(71) Applicant: LG CHEM, LTD., Seoul (KR)

(72) Inventors: Hyoung Kwon Kim, Daejeon (KR); Sang Uck Kim, Daejeon (KR); Hayoung Heo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 216 days.

(21) Appl. No.: 16/625,995

(22) PCT Filed: Nov. 7, 2018

(86) PCT No.: PCT/KR2018/013469
§ 371 (c)(1),
(2) Date: Dec. 23, 2019

(87) PCT Pub. No.: WO2019/107784
PCT Pub. Date: Jun. 6, 2019

(65) Prior Publication Data
US 2020/0127335 A1  Apr. 23, 2020

(30) Foreign Application Priority Data
Dec. 1, 2017  (KR) .................. 10-2017-0164546

(51) Int. Cl.
*H01M 10/0587*  (2010.01)
*H01M 10/613*  (2014.01)
(Continued)

(52) U.S. Cl.
CPC ..... *H01M 10/0587* (2013.01); *H01M 10/613* (2015.04); *H01M 10/643* (2015.04);
(Continued)

(58) Field of Classification Search
None
See application file for complete search history.

(56) References Cited

U.S. PATENT DOCUMENTS 8,021,779 B2  9/2011  Oh et al.
8,785,026 B2  7/2014  Hu et al.
(Continued)

FOREIGN PATENT DOCUMENTS

JP  2007-311274 A  11/2007
JP  2013-004402 A  1/2013
(Continued)

OTHER PUBLICATIONS

International Search Report (with partial translation) and Written Opinion issued in corresponding International Patent Application No. PCT/KR2018/013469, dated Mar. 29, 2019.
(Continued)

*Primary Examiner* — Lisa S Park
(74) *Attorney, Agent, or Firm* — Morgan, Lewis & Bockius LLP

(57) ABSTRACT

The present invention provides a secondary battery including: an electrode assembly ('jelly-roll') having a structure in which a positive electrode, a negative electrode, and a separator interposed between the positive electrode and the negative electrode are wound together; a can main body inside of which a hollow having an open side is formed and in which the electrode assembly is accommodated in a shape surrounding the hollow; and a top cover mounted on an open upper end portion of the can main body to seal the can main body, wherein one of a bottom portion of the can main body and the top cover may be formed with a through-hole communicating with the hollow of the can main body, and at least 50% of a total volume of the hollow is filled with a
(Continued)

thermally conductive resin, and provides a secondary battery pack including the secondary battery.

19 Claims, 5 Drawing Sheets

(51) Int. Cl.
*H01M 10/643* (2014.01)
*H01M 10/647* (2014.01)
*H01M 10/654* (2014.01)
*H01M 50/30* (2021.01)
*H01M 50/552* (2021.01)
*H01M 4/02* (2006.01)

(52) U.S. Cl.
CPC ....... *H01M 10/647* (2015.04); *H01M 10/654* (2015.04); *H01M 50/561* (2021.01); *H01M 2004/027* (2013.01); *H01M 2004/028* (2013.01)

(56) References Cited

U.S. PATENT DOCUMENTS

| | | | |
|---|---|---|---|
| 9,209,483 B2 | 12/2015 | Fuhr et al. | |
| 9,214,705 B2 | 12/2015 | Lee et al. | |
| 9,577,231 B2 | 2/2017 | Fuhr et al. | |
| 9,774,020 B2 | 9/2017 | Fuhr et al. | |
| 9,865,904 B2 | 1/2018 | Lee et al. | |
| 2003/0215702 A1* | 11/2003 | Tanjou | H01M 50/507 |
| | | | 429/185 |
| 2005/0069484 A1* | 3/2005 | Manev | C01G 53/50 |
| | | | 423/594.15 |
| 2008/0220320 A1* | 9/2008 | Horikoshi | G06F 1/1632 |
| | | | 429/82 |
| 2010/0021801 A1* | 1/2010 | Park | H01M 50/166 |
| | | | 429/246 |
| 2010/0310920 A1 | 12/2010 | Chang et al. | |
| 2012/0052351 A1* | 3/2012 | Yeh | H01M 10/0587 |
| | | | 429/94 |
| 2012/0196163 A1 | 4/2012 | Shimizu et al. | |
| 2014/0045000 A1 | 2/2014 | Kim | |
| 2014/0356685 A1* | 12/2014 | Okuda | H01M 10/6554 |
| | | | 429/120 |
| 2018/0013114 A1 | 1/2018 | Fuhr et al. | |
| 2018/0183117 A1 | 6/2018 | Cho et al. | |

FOREIGN PATENT DOCUMENTS

| | | |
|---|---|---|
| JP | 2014-036014 A | 2/2014 |
| JP | 2017-212145 A | 11/2017 |
| KR | 10-2006-0027279 A | 3/2006 |
| KR | 10-2006-0034130 A | 4/2006 |
| KR | 20100132333 A | 12/2010 |
| KR | 10-2013-0138893 A | 12/2013 |
| KR | 10-2014-0033232 A | 3/2014 |
| KR | 10-2016-0146587 A | 12/2016 |
| KR | 10-2017-0005581 A | 1/2017 |
| KR | 10-2017-0060451 A | 6/2017 |
| KR | 10-2017-0070542 A | 6/2017 |

OTHER PUBLICATIONS

Korean Office Action dated Nov. 30, 2020 in counterpart Korean Patent Application No. 10-2017-0164546 Note: US 20120052351 and KR 10-2016-0146587 cited therein are already of record.
Extended European Search Report issued in corresponding EP App No. 18884307.2, dated May 26, 2020. Note: KR 2017-0070542-A cited therein is already of record.
Japanese Office Action dated Jan. 25, 2021 in counterpart Japanese Patent Application No. 2019-568245 Note: KR10-2017-0070542, US 2012/0052351, and KR 10-2016-0146587 are already of record.
Office Action dated Sep. 6, 2021, issued in corresponding Japanese Patent Application No. 2019-568245. Note: KR 10-2017-0070542, KR 10-2016-0146587, JP 2013-004402, JP 2007-311274, and US 2012/0052351 are already of record.

* cited by examiner

CYLINDRICAL SECONDARY BATTERY HAVING HOLLOW PORTION FILLED WITH THERMAL CONDUCTIVE RESIN

TECHNICAL FIELD

Background Art

(a) Field of the Invention

Cross-Reference to Related Application(s)

This application claims priority to and the benefit of Korean Patent Application No. 10-2017-0164546 filed in the Korean Intellectual Property Office on Dec. 1, 2017, the entire contents of which are incorporated herein by reference.

The present invention relates to a secondary battery having a hollow filled with a thermally conductive resin, which has improved heat radiating performance.

(b) Description of the Related Art

With technology development and a demand for mobile devices, demand for secondary batteries as an energy source has been rapidly increasing, and among such secondary batteries, much research has been conducted on lithium secondary batteries having high energy density and discharge voltage, and they have also been commercially available and widely used.

The secondary battery is classified according to a battery case, and for example, may be classified into a cylindrical battery and a prismatic battery of which an electrode assembly is embedded in a cylindrical or prismatic metal can, and a pouch-type battery of which an electrode assembly is embedded in a pouch-type case of an aluminum laminate sheet. Among them, the cylindrical battery and the prismatic battery are applied to and used in various devices according to their shape characteristics.

In general, the electrode assembly embedded in the cylindrical battery or the prismatic battery is a chargeable/ dischargeable power generation device having a structure in which a positive electrode, a separating film, and a negative electrode are stacked, and is formed in a jelly-roll shape, in which the separating film is interposed between the positive electrode and the negative electrode respectively having an elongated sheet type, on which an electrode active material is applied, and then is wound based on a winding core.

The electrode assembly of the jelly-roll shape has advantages of easy manufacture and high energy density per weight.

The secondary battery radiates heat generated during charging and discharging through a case to the outside, and the heat radiating characteristic of such a secondary battery is very important to determine performance of the secondary battery.

Particularly, for example, in the cylindrical battery, when a radius and a height thereof are doubled, its capacity increases by 8 times in proportion to its volume. However, a heat radiating area thereof is only 4 times. Therefore, when capacity of a battery is increased by 8 times, a surface area per unit capacity is reduced to half. In addition, the secondary battery has poor heat radiating characteristic at a central portion thereof, and a temperature thereat is the highest. In a large-sized battery, since a length from a center thereof to a surface thereof becomes long, a temperature gradient occurs in which a temperature increases toward the inside from the surface thereof at which heat easily radiates, and thus, a temperature of a central portion in which cooling is most important increases. When the temperature of the battery becomes too high due to the above-mentioned reason, the battery performance is deteriorated.

Further, when the cylindrical or prismatic battery is manufactured as a middle- or large-sized battery, the heat in the central portion of the battery is difficult to discharge to the outside, and thus, when repeated charging and discharging are performed, heat generation increases at the central portion, which may shorten the lifespan of the secondary battery, and may cause ignition or explosion of the secondary battery.

In order to solve such a problem, conventionally, a hollow is formed in the central portion of the cylindrical or prismatic battery to allow air to pass therethrough, thereby improving the cooling performance of the central portion which is difficult to cool.

However, the secondary battery having such a hollow also has a limitation in heat radiation of air cooling, and when the size of the secondary battery is increased in accordance with the recent demand for capacity increase, or when the secondary battery is applied to a battery pack used for a device such as an electric tool, it does not provide sufficient heat radiating characteristics to a desired degree as it is repeatedly used.

Accordingly, there is a need for a secondary battery capable of solving the above problem with greatly improved cooling efficiency.

DISCLOSURE

Technical Problem

An object of the present invention is to solve the problems of the prior art and technical problems from the past.

Technical Solution

By repeating in-depth studies and various experiments, the inventors of the present application confirmed that when a secondary battery includes a hollow which is formed therein of which 50% or more of a total volume is filled with a thermally conductive resin, which will be described later, a desirable effect is exhibited, and completed the present invention.

An embodiment of the present invention provides a secondary battery including: an electrode assembly ('jellyroll') having a structure in which a positive electrode, a negative electrode, and a separator interposed between the positive electrode and the negative electrode are wound together;

a can main body inside of which a hollow having an open side is formed and in which the electrode assembly is accommodated in a shape surrounding the hollow; and a top cover mounted on an open upper end portion of the can main body to seal the can main body, wherein one of a bottom portion of the can main body and the top cover may be formed with a through-hole communicating with the hollow of the can main body, and at least 50% of a total volume of the hollow may be filled with a thermally conductive resin.

Here, the hollow may have a structure extending from a bottom portion of the can main body or the top cover in a direction in which the electrode assembly is embedded, and one side thereof is closed, so that the hollow may be filled with the thermally conductive resin.

In this case, specifically, 50% or more of the total volume of the hollow may be filled with the thermally conductive resin, and more specifically, 90% or more of the total volume of the hollow may be filled with the thermally conductive resin.

Therefore, the secondary battery according to the present invention may discharge heat through conduction having the best heat radiating characteristic by filling the thermally conductive resin into the hollow formed at a center of the battery, thereby further improving cooling efficiency of a center portion thereof.

Generally, the heat radiating characteristics are in the order of conduction> water cooling> air cooling.

The thermally conductive resin capable of maximizing the effect according to the present invention is not limited as long as it is a material having thermal conductivity and is a solid at room temperature, and for example, it may be a polymer made of urethane or silicon as a base material and alumina or boron nitride as an auxiliary material.

The thermally conductive resin may have a thermal conductivity at room temperature of 1.1 W/m·K to 3.0 W/m·K.

When the thermal conductivity is lower than the above range, the cooling effect intended by the present invention may not be achieved, and a resin having thermal conductivity out of the above range is not preferable because it is difficult to be commercialized.

Meanwhile, in order to further improve the cooling effect through conduction of the thermally conductive resin, the secondary battery may further include a metal rod inserted into the hollow so that one end thereof is in contact with the thermally conductive resin and the other end is exposed to the outside of the hollow.

This is because the thermally conductive resin may not be filled so that the thermally conductive resin is exposed to the outside from the hollow of the secondary battery, and the air cooling effect by the outside air may not be obtained, and thus, by adding the metal rod that contacts the thermally conductive resin, heat is conducted and released from the secondary battery to the thermally conductive resin and from the thermally conductive resin to the metal rod, and the metal rod is exposed to the outside, so that the effect of air cooling may be obtained, thereby further maximizing the cooling effect.

In this case, the contact portion between the thermally conductive resin and the metal rod may be 50% or less based on an entire surface area of the metal rod.

That is, according to the present invention, the thermally conductive resin may preferentially be filled in the hollow, and the metal rod may be inserted into the hollow, and the other end of the metal rod may contact the outside air. Otherwise, when the metal rod is completely inserted into the thermally conductive resin out of the above range, the air cooling effect due to the external exposure may not be obtained, which is not preferable.

The metal rod may have an outer diameter that is smaller than an inner diameter of the hollow so that the metal rod may be inserted into the hollow to contact the thermally conductive resin filled in the hollow.

The metal rod is not limited as long as it is a material having good thermal conductivity, and may include a highly conductive material such as copper or aluminum.

The hollow may have a size corresponding to an inner diameter of the wound electrode assembly.

The term 'corresponding' refers to the same or substantially the same degree, and it means that, depending on its structure, the wound electrode assembly may have a diameter that is smaller than or equal to an inner diameter of the electrode assembly wound so as to be inserted into the can main body provided with the hollow, but there may be a deviation within a range that minimizes a decrease in capacity.

In the secondary battery of the present invention, an upper insulator and a lower insulator may be disposed on an upper surface and a lower surface of the electrode assembly, and one of the upper insulator and the lower insulator may be formed with a through-hole corresponding to a size of the hollow so as to correspond to a through-hole formed in one of the bottom portion of the can main body and the top cover.

That is, the secondary battery according to the present invention having such a structure may be a prismatic battery or a cylindrical battery.

Therefore, the structure of the secondary battery of the present invention is the same as that of a general cylindrical battery or prismatic battery except for the hollow and the thermally conductive resin filled in the hollow.

Specifically, in a case of a cylindrical battery, the top cover may include: a top cap coupled to an open end of the can main body and disposed in a protruding shape at an uppermost portion to form a positive electrode terminal; and a PTC element disposed at a lower portion of the top cap, contacting an electrode lead extending from the electrode assembly, and having a resistance value that is varied depending on a temperature.

The present invention also provides a secondary battery pack, in which two or more secondary batteries are included, having a structure for more effectively achieving the heat radiating effect intended by the present invention.

Specifically, the secondary battery pack includes two or more secondary batteries, wherein:

the secondary battery includes an electrode assembly ('jelly-roll') having a structure in which a positive electrode, a negative electrode, and a separator interposed between the positive electrode and the negative electrode are wound together;

a can main body inside which a hollow having a closed side is formed and in which the electrode assembly is accommodated in a shape surrounding the hollow; and a top cover mounted on an open upper end portion of the can main body to seal the can main body, wherein one of a bottom portion of the can main body and the top cover may be formed with a through-hole communicating with the hollow of the can main body, and at least 50% of a total volume of the hollow may be filled with a thermally conductive resin, and the thermally conductive resin may be in contact with a pack terminal electrically connecting the two or more secondary batteries.

In this case, for contact between the thermally conductive resin and the pack terminal, the pack terminal may include a protruding portion partially inserted into the hollow at a portion corresponding to the hollow of the secondary battery, and the protruding portion may be in contact with the thermally conductive resin in the hollow.

In other words, when the pack terminal includes the protruding portion, the contact area with the thermally conductive resin may be widened, and the pack terminal may be inserted and fixed in the hollow, thus the pack terminal may preferably have a sufficient contact area without a separate member for contacting the thermally conductive resin and the pack terminal.

When the pack terminal and the thermally conductive resin are in contact with each other by such a structure, while two or more secondary batteries are electrically connected by the pack terminal, heat is conducted from the secondary battery to the thermally conductive resin, and from the thermally conductive resin to the pack terminal, and the pack terminal may contact the outside air or an additional cooling system may be added, thus a further improved heat radiating effect may be achieved, and two functions may be performed with one member, which is more efficient. In this case, the cooling system may be a cooling system of air-cooling or water-cooling, but it is more preferable that it is water-cooling capable of cooling better than air-cooling for a better heat radiating effect.

As another structure, when the secondary battery further includes a metal rod contacting the thermally conductive resin, the secondary battery pack includes two or more secondary batteries, wherein the secondary battery may include: an electrode assembly ('jelly-roll') having a structure in which a positive electrode, a negative electrode, and a separator interposed between the positive electrode and the negative electrode are wound together;

a can main body inside which a hollow having a closed side is formed and in which the electrode assembly is accommodated in a shape surrounding the hollow; and a top cover mounted on an open upper end portion of the can main body to seal the can main body, wherein one of a bottom portion of the can main body and the top cover may be formed with a through-hole communicating with the hollow of the can main body, and at least 50% of a total volume of the hollow may be filled with a thermally conductive resin, and a metal rod may be inserted into the hollow so that one end thereof may be in contact with the thermally conductive resin and the other end may be exposed to the outside of the hollow, and the other end of the metal rod may be in contact with a pack terminal electrically connecting the two or more secondary batteries.

That is, as described above, when the metal rod having one end contacting the thermally conductive resin is inserted in the hollow, the metal rod is exposed to the outside, so that the pack terminal and the metal rod are combined, and thus the same cooling effect as when the protruding portion is formed in the terminal may be obtained.

The metal rod and the pack terminal may be combined by welding or mechanical fastening. Here, the mechanical fastening may be achieved by forming a fastening groove corresponding to the size of the metal rod in the pack terminal like a male-female coupling.

Meanwhile, the pack terminal is connected to (+) terminals or (−) terminals of the secondary batteries for electrically connecting two or more secondary batteries.

The pack terminal is not limited thereto, and a type thereof is determined depending on properties thereof, and for example, in a case of the (+) pack terminal, it may be specifically made of nickel, and in a case of the (−) pack terminal, it is made of any one of copper, nickel, a cladding of nickel and copper, and an alloy of copper and other metals, and the metal rod may be a highly conductive material such as copper or aluminum.

In this case, generally, since the cylindrical battery or the prismatic battery is provided with a (+) terminal at an upper portion thereof and a (−) terminal at a lower portion thereof, when the through-hole communicating with the hollow of the secondary battery is formed in the bottom portion of the can main body, the pack terminal connected to the (−) terminal may have the fastening groove to be fastened to the protruding portion or the metal rod, and when the through-hole communicating with the hollow of the secondary battery is formed in the top cover, the pack terminal connected to the (−) terminal may have the fastening groove to be fastened to the protruding portion or the metal rod.

The secondary battery pack is not limited, and may be applied to various devices in which a lithium secondary battery may be used at present, and more particularly, it may be used for an electric tool with rapid degradation due to repeated use and a large temperature rise during discharge, or for an electric vehicle using a water-cooling or air-cooling cooling system for the secondary battery.

The secondary battery according to the present invention may be manufactured, for example, by accommodating an electrode assembly in a can main body provided with a hollow, combining a top cover thereto, filling the hollow with a thermally conductive resin paste to a desired hollow height, and then drying and hardening the paste, or inserting a metal rod into the paste before the paste is hardened so that one end of the the metal rod may be in contact with the paste, and then hardening the paste.

In addition, when the secondary battery has, for example, the structure in which the metal rod is not inserted, the secondary battery pack may be manufactured by preparing a pack terminal having a protruding portion and then by arranging the hollow of the secondary battery to fit into the protruding portion of the pack terminal, or when the secondary battery has the structure in which the metal rod is inserted, the secondary battery pack may be manufactured by preparing a pack terminal having a fastening groove to which the metal rod is coupled, inserting the metal rod into the fastening groove of the pack terminal, and arranging the secondary batteries upright.

Advantageous Effects

As described above, the secondary battery according to the present invention may obtain the heat radiating effect by heat conduction by filling the hollow formed in the can main body with the thermally conductive resin at 50% or more of the total volume of the hollow, thereby providing excellent cooling efficiency.

In addition, in the secondary battery pack according to the present invention, it is possible to maximize the heat radiating effect due to heat conduction as well as to electrically connect the secondary batteries through the pack terminal in contact with the thermally conductive resin of the secondary battery, thereby further improving the cooling efficiency and assembly convenience.

MODE FOR INVENTION

Figure 1:
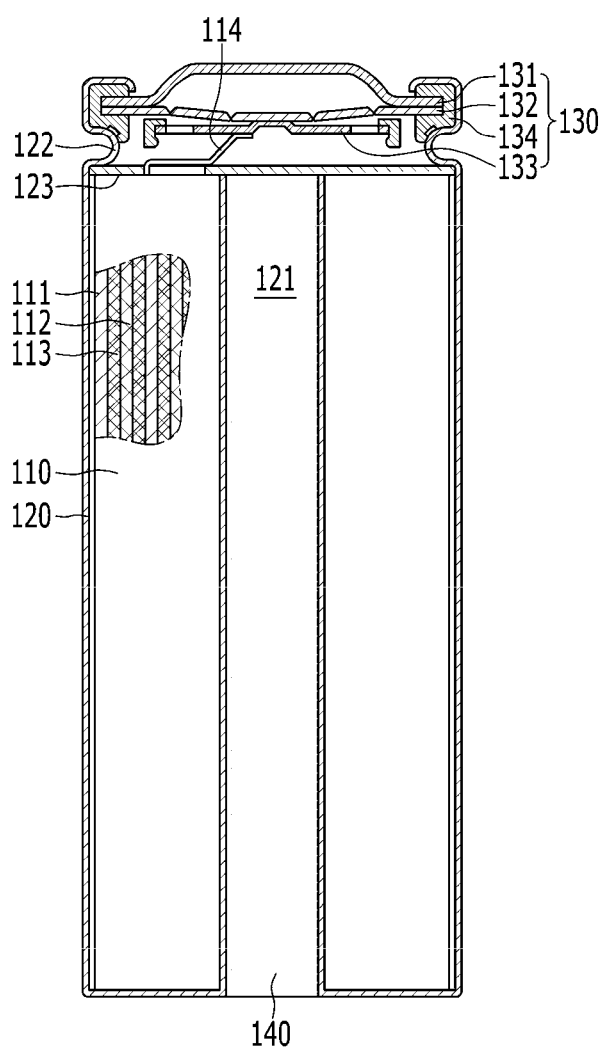
FIG. 1 illustrates a schematic cross-sectional view of a cylindrical secondary battery according to an embodiment of the present invention.

Hereinafter, an embodiment of the present invention is described with reference to the drawings, and is provided for easy understanding of the present invention, but the scope of the present invention is not limited thereto. In describing the embodiments of the present invention, a detailed description of pertinent known constructions or functions will be omitted if it is deemed to make the gist of the present invention unnecessarily vague.

The embodiments of the present invention are provided to explain the present invention more fully to one of ordinary skill in the art, so shapes and sizes of the components in the drawings may be exaggerated, omitted, or schematically shown for clarity. Accordingly, the size or ratio of each component does not entirely reflect an actual size or ratio thereof.

FIG. 1 illustrates a schematic cross-sectional view of a cylindrical secondary battery according to an embodiment.

Referring to FIG. 1, a secondary battery 100 according to the present invention includes an electrode assembly 110, a can main body 120 containing an electrolyte, and a top cover 130 mounted on an open upper end portion of the can main body 120 to seal the can main body 120.

In the electrode assembly 110, a positive electrode 111 and a negative electrode 112 are disposed with a separator 113 therebetween and housed in the can main body 120, and in this case, the electrode assembly 110 is spirally wound and disposed in a jellyroll shape to surround a hollow 121 to be described later.

Here, the electrodes of the electrode assembly 110 are formed to have a structure in which a current collector is coated with an electrode composite, and the electrode composite may include an active material, a binder, a conductive material, a plasticizer, etc.

In addition, in a direction in which the electrodes are wound, there is an uncoated region in which the electrode composite is not formed at a starting end and a finishing end of the current collector, and electrode leads corresponding to the respective electrodes are attached to the uncoated region. Generally, in the cylindrical secondary battery, a positive electrode lead 114 is attached to an upper end of the electrode assembly 110 and is electrically connected to the top cover 130, and a negative electrode lead (not shown) is attached to the lower end of the electrode assembly 110 to be coupled to a bottom surface of the can main body 120.

An upper insulator 123 is disposed on an upper surface of the electrode assembly 110, and a lower insulator is disposed on a lower surface of the electrode assembly 110. When the hollow to be described later communicates with the bottom portion of the can main body 120, a through-hole corresponding to a size of the hollow is formed in the lower insulator, and when the hollow communicates with the top cover 130, a through-hole corresponding to the size of the hollow is formed in the upper insulator 123.

Therefore, in FIG. 1, since the hollow to be described later communicates with the bottom portion of the can main body 120, the through-hole is formed in the lower insulator.

The can main body 120 may be made of a lightweight conductive metal material such as aluminum, stainless steel, or an alloy thereof, and a beading part 122 for fixing the electrode assembly 110 is formed on the upper end thereof. However, formation of the beading portion 122 is not essential.

The can main body 120 has the hollow 121 formed therein. Here, the hollow 121 means an empty space.

The hollow 121 is formed in a center of the can main body 120 and has an extended structure penetrating the bottom portion, in other words, the hollow 121 of FIG. 1 communicates with the bottom portion of the can main body 120, and is sealed by the upper insulator 123 and the top cover 130. However, this is only an example, and the hollow may communicate with the top cover, and in this case, the hollow may be sealed by the lower insulating plate and the bottom surface of the can main body.

As such, the hollow 121 of which one side is sealed is filled with a thermally conductive resin 140 at 50% or more of a total volume thereof.

Compared with a conventional structure, since the secondary battery 100 having such a structure may absorb heat generated from the secondary battery 100 even in the hollow by the thermally conductive resin 140 filled in the hollow, and then may discharge the heat to the outside through conduction with the highest heat radiating efficiency, cooling efficiency at the center thereof may be further improved.

As will be described later in detail, since the thermally conductive resin filled in the hollow is in contact with a metal rod made of a metal material or a metal of a pack terminal electrically connecting the secondary batteries to make it easier to discharge the heat to the outside, it is possible to improve a cooling effect.

The top cover 130 includes a top cap 131 that is disposed at an uppermost position of the top cover 130 in an upwardly protruding form and forming a positive electrode terminal, a safety vent 132 of which shape is deformed by an internal pressure of the secondary battery 100, a current blocking member 133 that is in contact with the safety vent 132 in a normal state and is electrically disconnected from the safety vent 132 when the internal pressure increases due to generation of gas, and a gasket 134 surrounding an edge portions of the safety cap 132 and the top cap 131. However, the present invention is not limited thereto, and elements of a conventional cylindrical secondary battery may be included.

Figure 2:
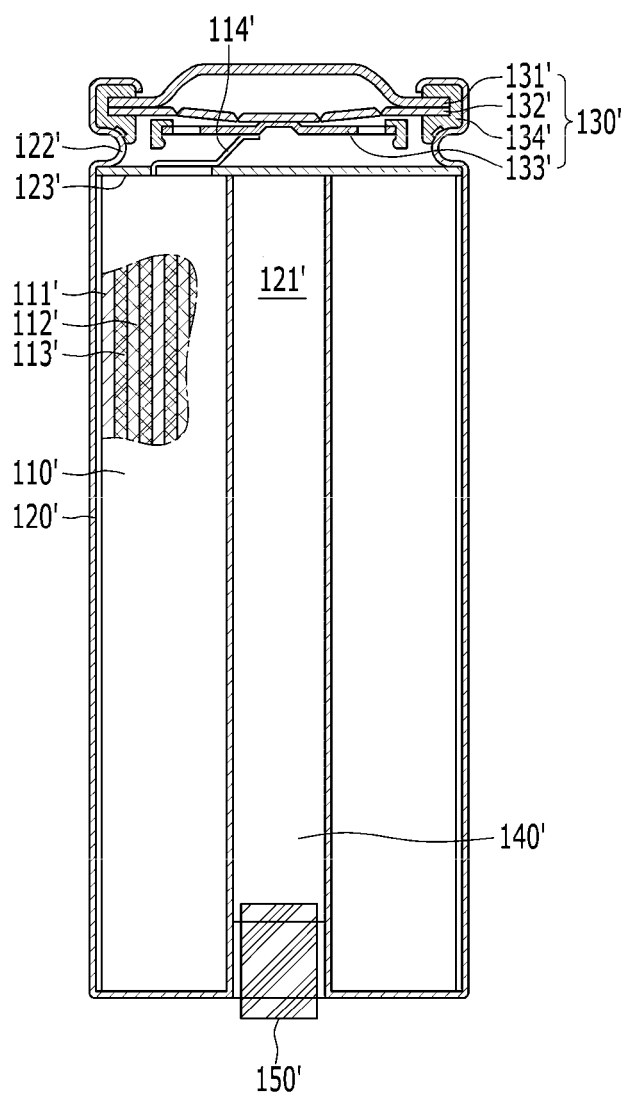
FIG. 2 illustrates a schematic cross-sectional view of a cylindrical secondary battery according to another embodiment of the present invention.

FIG. 2 illustrates a schematic cross-sectional view of a cylindrical secondary battery according to another embodiment.

Except for an inner structure of a hollow 121' of a can main body 120', the cylindrical secondary battery according to the present embodiment has the same configuration as that of FIG. 1. Therefore, as the same reference numerals as those of FIG. 1 are used for the same elements, descriptions thereof will be omitted, and only differences of the inner structure of the hollow will be described later.

Compared with FIG. 1, a secondary battery 100' of FIG. 2 has a structure in which a thermally conductive resin 140' is filled in the hollow 121' formed in the can main body 120', as in FIG. 1. In this case, the thermally conductive resin 140' is filled at about 80% of a total volume of the hollow 121', and a metal rod 150', which has one end in contact with the thermally conductive resin 140' and the other end exposed to the outside of the hollow 121', is inserted into the end of the thermally conductive resin 140' filled in the hollow 121' communicating with a bottom portion of the can main body 120'.

Here, the metal rod 150' is not limited as long as it is in contact with the thermally conductive resin 140', and in order to increase the heat conduction efficiency, the metal rod 150' may be inserted into the thermally conductive resin 140' to increase a contact area. In this case, the contact area may be 50% or less based on an entire surface area of the metal rod 150'.

Here, the metal rod 150' is not limited as long as it is a metallic material having excellent thermal conductivity, and may be a highly conductive material such as copper or aluminum.

Compared with a conventional structure, since the secondary battery 100' having such a structure may absorb heat generated from the secondary battery 100' even in the hollow by the thermally conductive resin 140' filled in the hollow and the metal rod 150' contacting the thermally conductive resin 140', and then may discharge the heat to the outside through conduction with the highest heat radiating efficiency, cooling efficiency at the center thereof may be further improved.

Figure 3:
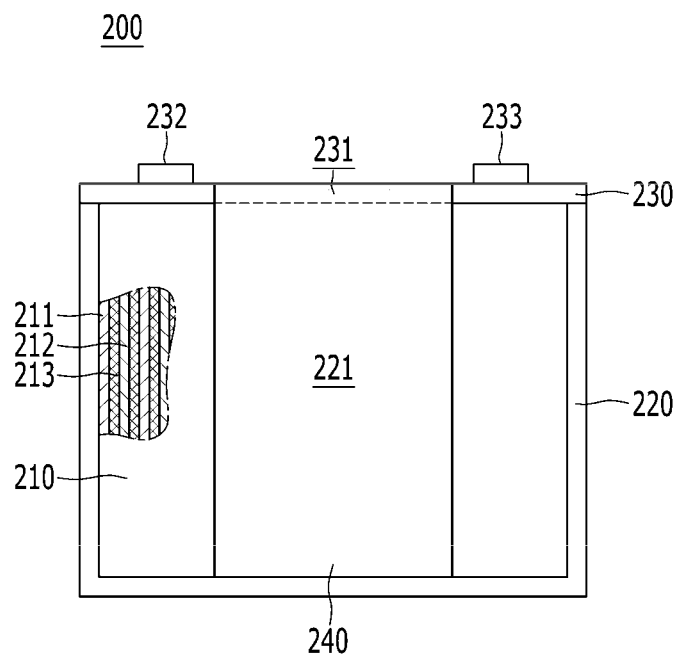
FIG. 3 illustrates a schematic cross-sectional view of a prismatic secondary battery according to another embodiment of the present invention.

As another embodiment, FIG. 3 illustrates a schematic cross-sectional view of a prismatic secondary battery.

Referring to FIG. 3, the secondary battery 200 includes a can main body 220 in which an electrode assembly 210 including a positive electrode 211, a negative electrode 212, and a separator 213 interposed between the positive electrode 211 and the negative electrode 212, is accommodated together with an electrolyte, and a top cover 230 mounted on an open upper end portion of the can main body 220 to seal the can main body 220.

In this case, the electrode assembly 210 is flatly wound and disposed in a jelly-roll shape so as to surround a hollow 221 to be described later.

Although a structure and a manufacturing method of the electrode are similar to those described in FIG. 1, in the prismatic secondary battery 200 of FIG. 3, a positive electrode lead and a negative electrode lead attached to an uncoated region of an electrode are attached to an upper end of the electrode assembly 210 so that they protrude from upper portions of both ends of the electrode assembly 210, and they are electrically connected to a positive terminal 232 and a negative terminal 233 protruding outside the top cover 230.

A material of the can and the like are the same as those described in FIG. 1.

In FIG. 3, the hollow 221 formed inside the can main body 220 is closed and sealed at the bottom portion of the can main body 220, and has an extended structure penetrating through the top cover 230. Accordingly, the top cover 230 is formed with a through-hole 231 communicating with the hollow 221 of the can main body 220.

The hollow 221 is filled with a thermally conductive resin 240 at 50% or more of the total volume thereof. In this case, it is possible for the thermally conductive resin 240 to be further filled up to the through-hole of the top cover 230 by its thickness.

Therefore, the prismatic secondary battery 200 according to the present invention, compared with a conventional structure, also absorbs heat generated from the secondary battery 200 even in the hollow, and then may discharge the heat to the outside through conduction with the highest heat radiating efficiency, so cooling efficiency at the center thereof may be further improved.

In addition, although not additionally shown, in a case of forming a secondary battery pack including a plurality of prismatic secondary cells as in a case of a cylindrical secondary battery to be described below, the heat radiating effect may be further improved by contact with a pack terminal thereof. In this case, it is well known to a person of ordinary skill in the art that the pack terminals are formed so that the positive electrode terminals and the negative electrode terminals are in contact with each other between them in parallel on the upper surfaces of the prismatic secondary batteries, respectively.

Figure 4:
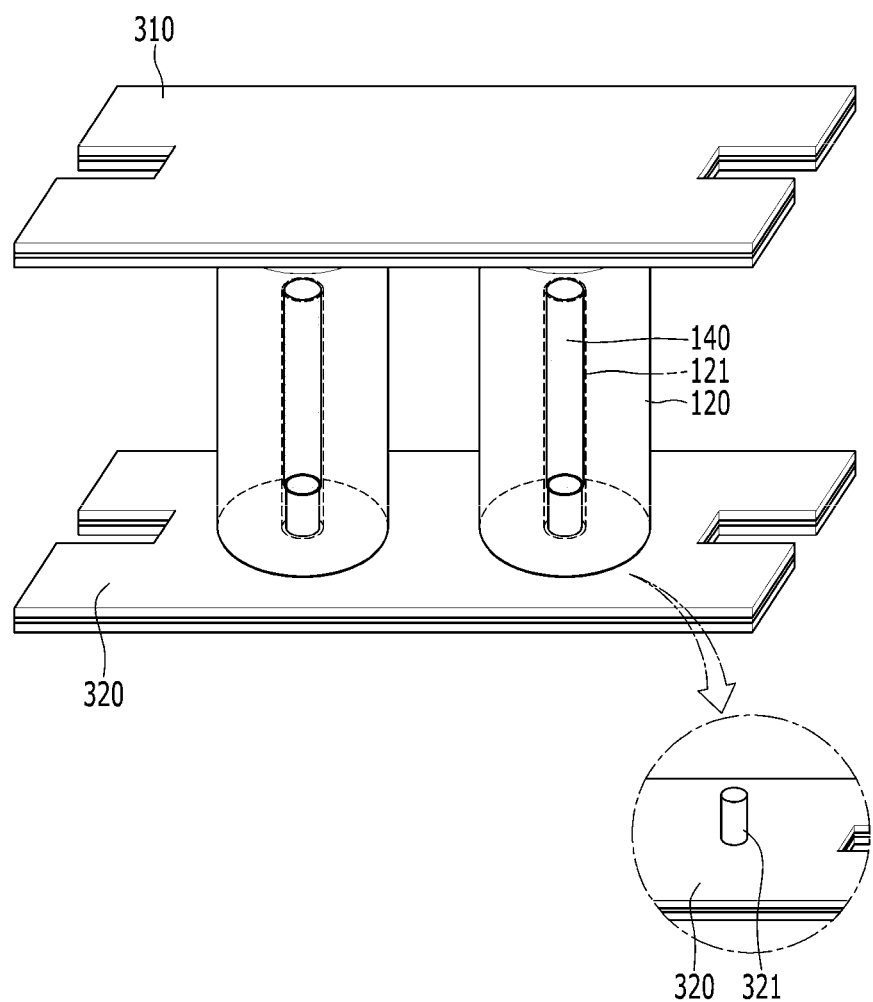
FIG. 4 illustrates a schematic perspective view of a secondary battery pack including the cylindrical secondary batteries of FIG. 1.

FIG. 4 illustrates a schematic perspective view of a secondary battery pack 300 including the cylindrical secondary batteries 100 of FIG. 1 in order to illustrate examples of structures for improving the heat radiating effect when the secondary battery pack is configured by using the secondary batteries.

Referring to FIG. 4 together with FIG. 1, the secondary battery pack 300 according to an embodiment of the present invention includes the secondary batteries 100 according to the present invention, a positive electrode pack terminal 310 electrically connecting the secondary batteries 100 in the top cover 130 that are electrically connected to the positive electrode leads of the secondary batteries, and a negative electrode pack terminal 320 electrically connecting the secondary batteries 100 in the bottom surface of the can main body 120 that are electrically connected to the negative electrode leads of the secondary batteries.

The constituent elements of the secondary battery pack may be further varied, but in order to more clearly illustrate the essence of the present invention, other constituent elements, except for the above-mentioned constituent elements, are omitted in the drawings.

The secondary batteries 100 may be arranged in a standing manner at predetermined intervals, and unlike the accompanying drawings, they may be arranged in a larger number or in various forms as required.

The secondary batteries 100 arranged in this manner are electrically connected by the pack terminals 310 and 320.

In this case, in the secondary batteries 100, as described above, the hollow 121 is formed inside the can main body 120, and since the hollow 121 has a structure that communicates with the bottom portion of the can main body 120, the thermally conductive resin 140 is in contact with the negative electrode pack terminal 320 electrically connecting the secondary batteries 100 on the bottom surface of the can main body 120.

The negative electrode pack terminal 320 may have a flat plate shape with the same plane as a general pack terminal, but the negative electrode pack terminal 320 includes a protruding portion 321 partially inserted into the hollow 121 at a portion corresponding to the hollow 121 of the secondary batteries 100 so that it may be inserted into the hollow 121 of the can main body 120 to tightly fix the secondary batteries 100 while widening the contact area with the thermally conductive resin 140 inside the hollow 121, and an end of the protruding portion 321 is in contact with the thermally conductive resin 140 in the hollow 121.

Here, the positive electrode pack terminal 310 and the negative electrode pack terminal 320 may each be a metal member, and specifically, the positive electrode pack terminal 310 may be made of nickel and the negative electrode pack terminal 320 may be made of copper, nickel, a cladding of nickel and copper, and alloys of copper and other metals.

The protruding portion 321 formed in the negative electrode pack terminal 310 may be made of the same material as the negative electrode pack terminal 310, or may be made of a highly conductive material such as copper or aluminum.

Accordingly, the metal having good thermal conductivity and the thermally conductive resin 140 contact each other, thereby providing a further improved heat radiating effect.

Figure 5:
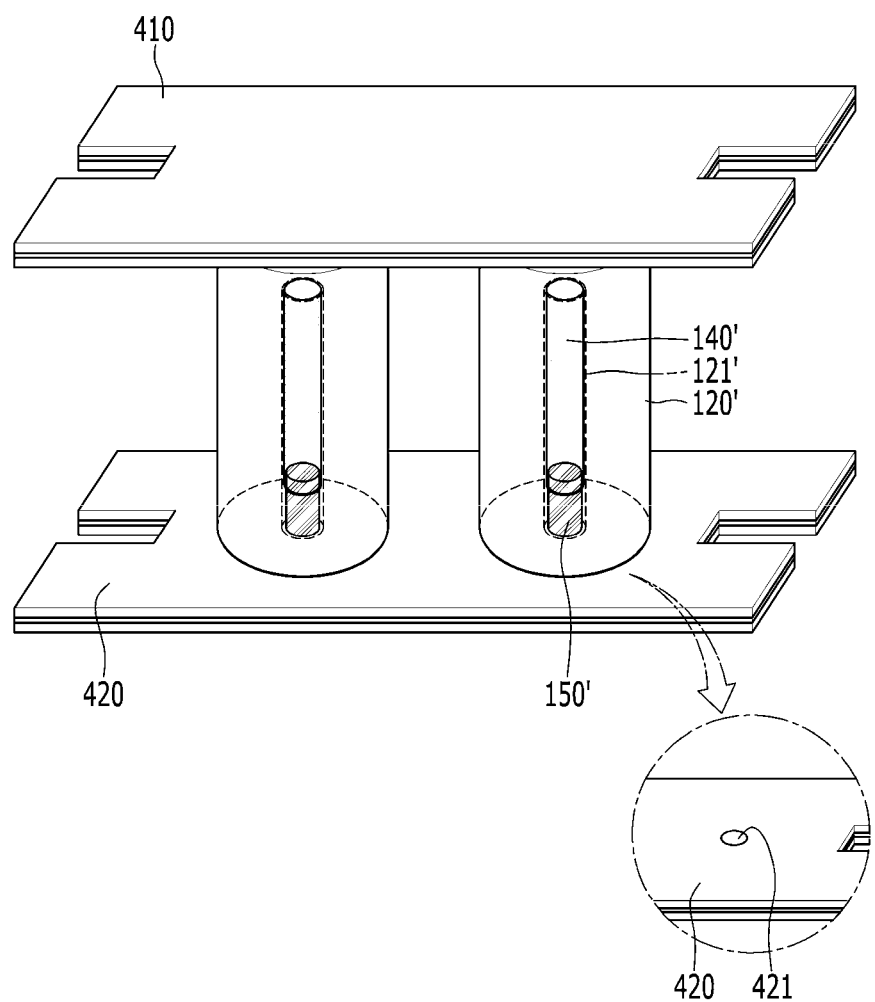
FIG. 5 illustrates a schematic perspective view of a secondary battery pack including the cylindrical secondary batteries of FIG. 2.

As another example, FIG. 5 illustrates a schematic perspective view of a secondary battery pack 400 including the cylindrical secondary batteries 100' of FIG. 2.

Referring to FIG. 5 together with FIG. 2, as described in FIG. 4, the secondary battery pack 400 according to an embodiment of the present invention includes the secondary batteries 100' according to the present invention, a positive electrode pack terminal 410 electrically connecting the secondary batteries 100' in a top cover 130' that are electrically connected to the positive electrode leads of the secondary batteries, and a negative electrode pack terminal 420 electrically connecting the secondary batteries 100 in the bottom surface of the can main body 120' that are electrically connected to the negative electrode leads of the secondary batteries.

In addition, the secondary batteries 100' are electrically connected by the pack terminals 410 and 420 in a standing state thereof.

In this case, as described above, in the secondary batteries 100', the hollow 121', which communicates with the bottom portion of the can 120' and is filled with the thermally conductive resin 140', is formed inside the can main body 120', and the metal rod 150', which includes one end in contact with the thermally conductive resin 140' and the other end exposed to the outside of the hollow 121', and is inserted into end of the thermally conductive resin 140', is included, thus the metal rod 150' contacts the negative electrode pack terminal 420 connecting the secondary batteries 100' on the bottom surface of the can main body 120'.

In this case, the negative electrode pack terminal 420, which has a flat plate shape, may include a fastening groove 421 in which the secondary battery 100' including the metal rod 150' may be more firmly fixed, and the metal rod 150' is inserted to further widen the contact area, so that the metal rod 150' and the negative electrode pack terminal 420 are mechanically fastened.

Here, the materials of the positive electrode pack terminal 310 and the negative electrode pack terminal 320 are the same as those described above.

Accordingly, the thermally conductive resin 140' of the secondary batteries 100' contacts the negative electrode pack terminal 420, which is made of a metal having good thermal conductivity and has a large area, through the metal rod 150', thereby providing a further improved heat radiating effect.

In the secondary battery packs having the above-described structure, two or more secondary batteries are electrically connected by the pack terminals, and heat is conducted from the secondary battery to the thermally conductive resin, and from the thermally conductive resin to the negative electrode pack terminal, so that an additional cooling system is added to the secondary battery pack that allows the negative electrode pack terminal to contact the outside air or cool the conducted heat to the negative electrode pack terminal, thereby providing a further improved heat radiating effect.

Hereinafter, the present invention is described with reference to the embodiments, but this is provided for easy understanding of the present invention, and the scope of the present invention is not limited thereto.

Exemplary Embodiment 1

$LiCoO_2$ was used as the positive electrode active material, and a positive electrode mixture slurry was prepared by adding 96 wt % of $LiCoO_2$, 2.0 wt % of Denka Black (conductive material), and 2.0 wt % of PVdF (binder) to N-methyl-2-pyrrolidone (NMP) as a solvent, then dried and pressed on aluminum foil to prepare the positive electrode.

Artificial graphite was used as the negative electrode active material, and an negative electrode mixture slurry was prepared by adding 96 wt % of artificial graphite, 1 wt % of Denka Black (conductive material), and 3 wt % of PVdF (binder) to NMP as a solvent, and dried and pressed on aluminum foil to produce the negative electrode.

The electrode assembly was manufactured by interposing a polyethylene porous film having a thickness of 16 μm between the positive electrolyte and the negative electrode, and the electrode assembly was accommodated in a case of a cylindrical shape (with a diameter of 18 to 21 mm) in which a hollow having a diameter of 3 to 10 mm was formed, then 1 M $LiPF_6$ carbonate-based solution electrolyte was injected thereto.

A polymer in which urethane and alumina was polymerized as a thermally conductive resin was injected in the hollow in a molten state at 90% of a volume of the hollow, and a metal rod made of aluminum was inserted to contact an end of the thermally conductive resin (with a contact portion of 30% of a surface area of the metal rod), and then the thermally conductive resin was dried and hardened to produce a secondary battery having the structure shown in FIG. 2.

Comparative Example 1

A secondary battery was produced in the same manner as in Exemplary Embodiment 1, except that the hollow of the cylindrical case was not filled with the thermally conductive resin and left empty.

Comparative Example 2

A secondary battery was produced in the same manner as in Exemplary Embodiment 1, except that a cylindrical case in which no hollow was formed was used.

Experimental Example 1

When the secondary batteries produced in Exemplary Embodiment 1 and Comparative Examples 1 and 2 were forcedly convected, naturally convected, and water-cooled, a surface temperature thereof, a core temperature thereof, a temperature differences therebetween, a time required to reach a reference temperature, a time required for re-discharging after a first discharge, and a time required for charging after a first discharge were determined, and are shown in Tables 1 to 3.

In Tables 1 to 3, T1 means a surface maximum temperature, T2 means a core maximum temperature, and ΔT means a difference between a maximum temperature of a surface portion and a maximum temperature of an inner portion.

In addition, in Tables 1 to 3, the time required to reach the reference temperature (75° C.), which is a run time, is measured by setting the discharge thereof to be stopped when the temperature of the secondary battery exceeds 75° C. during discharging, and measuring a time taken until the discharge is stopped; the waiting time required for re-discharging after the first discharge is a measured time taken for the secondary battery to discharge again by setting the discharge to be possible again when the temperature of the secondary battery drops to 50° C. after the temperature of the secondary battery reaches 75° C. and the discharge is finished; and the waiting time required for charging after the discharging is a measured time taken to set the charging to start at a predetermined temperature or less when the discharging is finished at 75° C. and then for the charging to actually start.

A natural convection condition in Table 1 is measured at 0 m/s, a forced convection condition in Table 2 is measured at 3 m/s, and a water-cooling condition in Table 3 is measured at a water temperature of 23° C.

TABLE 1

| | T1 (° C.) | T2 (° C.) | ΔT (° C.) | Run time (s) (at which the surface maximum temperature reaches 75° C.) | Waiting time for re-discharging (at which the surface maximum temperature reaches 75° C. -> 50° C.) | Waiting time for charging after discharging (at which the surface maximum temperature reaches 75° C. -> 30° C.) |
|---|---|---|---|---|---|---|
| Exemplary Embodiment 1 | 75.5 | 92.7 | 17.2 | 230 | 855 | 2420 |
| Comparative Example 1 | 74.9 | 94.3 | 19.4 | 220 | 800 | 2300 |
| Comparative Example 2 | 74.8 | 99.0 | 24.2 | 240 | 895 | 2605 |

TABLE 2

| | T1 (° C.) | T2 (° C.) | ΔT (° C.) | Run time (s) (at which the surface maximum temperature reaches 75° C.) | Waiting time for re-discharging (at which the surface maximum temperature reaches 75° C. -> 50° C.) | Waiting time for charging after discharging (at which the surface maximum temperature reaches 75° C. -> 30° C.) |
|---|---|---|---|---|---|---|
| Exemplary Embodiment 1 | 75.2 | 92.5 | 17.3 | 230 | 705 | 2075 |
| Comparative Example 1 | 75.5 | 95.6 | 20.1 | 225 | 750 | 2120 |
| Comparative Example 2 | 75.2 | 100.3 | 25.1 | 245 | 840 | 2225 |

TABLE 3

| | T1 (° C.) | T2 (° C.) | ΔT (° C.) | Run time (s) (at which the surface maximum temperature reaches 75° C.) | Waiting time for re-discharging (at which the surface maximum temperature reaches 75° C. -> 50° C.) | Waiting time for charging after discharging (at which the surface maximum temperature reaches 75° C. -> 30° C.) |
|---|---|---|---|---|---|---|
| Exemplary Embodiment 1 | 71.6 | 98.2 | 27 | 300 | 245 | 640 |
| Comparative Example 1 | 75.2 | 97.3 | 22 | 235 | 545 | 1465 |
| Comparative Example 2 | 75.4 | 104.4 | 30 | 260 | 650 | 1870 |

Referring to Tables 1 to 3, it can be seen that the secondary battery according to the present invention has a relatively low temperature in the secondary battery core as compared with the secondary battery manufactured in the comparative example.

It can be seen that in the case of water cooling, the difference between the core temperature and the surface temperature of Comparative Example 1 is relatively low, which has no significant difference in comparison with Exemplary Embodiment 1, while the surface temperature of Exemplary Embodiment 1 does not reach 75° C.

Referring to the run time, it can be seen that the operation time of the secondary battery according to Exemplary Embodiment 1 of the present invention is longer than that of Comparative Example 1 in which the hollow thereof is empty. This is because the operation time increases as the heat generation decreases, and it is preferable that the operation time is long. On the other hand, its operation time is shorter than that of Comparative Example 2 in which the hollow is not formed, which is because, in a case of a battery including a hollow, capacity is reduced by a size of the hollow such that a current density per unit area based on the same output increases and thus heat generation increases, and therefore the run time has a meaning as compared with Comparative Example 1.

The re-discharging waiting time and the charging waiting time represent how well the cooling is performed, and it can be seen that both the re-discharging waiting time and the charging waiting time of the secondary battery according to the present invention are shorter than those of the comparative examples.

This means that the heat radiation is good and the heat radiating speed is high, and thus, according to the present invention, it can be confirmed that an excellent cooling effect is obtained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A secondary battery, comprising:
a jelly-roll electrode assembly having a structure in which a positive electrode, a negative electrode, and a separator interposed between the positive electrode and the negative electrode are wound together;
a can main body inside of which a hollow is defined, the hollow having an open side and in which the electrode assembly is accommodated surrounding the hollow; and
a top cover on an open upper end portion of the can main body to seal the can main body,
wherein one of a bottom portion of the can main body and the top cover includes a through-hole communicating with the hollow of the can main body, and
at least 50% of a total volume of the hollow is filled with a thermally conductive resin, and
wherein the thermally conductive resin is a polymer comprising urethane or silicon as a base material and alumina or boron nitride as an auxiliary material.

2. The secondary battery of claim 1, wherein an upper insulator and a lower insulator are on an upper surface and a lower surface of the electrode assembly, and wherein one of the upper insulator and the lower insulator includes a through-hole having a size corresponding to a size of the hollow.

3. The secondary battery of claim 1, further comprising a metal rod inserted into the hollow so that one end thereof is in contact with the thermally conductive resin and the other end is exposed to an outside of the hollow.

4. The secondary battery of claim 3, wherein a contact area between the thermally conductive resin and the metal rod is 50% or less based on a total surface area of the metal rod.

5. The secondary battery of claim 3, wherein an outer diameter of the metal rod is smaller than an inner diameter of the hollow.

6. The secondary battery of claim 1, wherein the hollow has a size corresponding to an inner diameter of the electrode assembly having the wound structure.

7. The secondary battery of claim 1, wherein the secondary battery is a cylindrical or prismatic battery.

8. A secondary battery pack including two or more secondary batteries of claim 1, wherein the thermally conductive resin is in contact with a pack terminal electrically connecting the two or more secondary batteries.

9. The secondary battery pack of claim 8, wherein the pack terminal includes a protruding portion partially inserted into the hollow at a portion corresponding to the hollow of the secondary battery, and the protruding portion is in contact with the thermally conductive resin in the hollow.

10. A secondary battery pack comprising two or more secondary batteries of claim 1, wherein a metal rod is inserted into the hollow so that one end thereof is in contact with the thermally conductive resin and the other end is exposed to the outside of the hollow, and the other end of the metal rod is in contact with a pack terminal electrically connecting the two or more secondary batteries.

11. The secondary battery pack of claim 10, wherein the metal rod and the pack terminal are combined by welding or mechanical fastening.

12. A device including the secondary battery pack of claim 8 as a power source.

13. The secondary battery of claim 1, wherein an end of the hollow adjacent to the top cover includes a closed side and an end of the hollow opposite from the top cover includes the open side.

14. The secondary battery of claim 1, wherein an end of the hollow adjacent to the top cover includes the open side and an end of the hollow opposite from the top cover includes a closed side.

15. A secondary battery, comprising:
a cylindrical can main body including a first wall and a second wall each cylindrically arranged around a cylindrical axis of the can main body, an accommodation space between the first wall and the second wall and a hollow inside the first wall;
a spiral wound electrode assembly in the accommodation space, the electrode assembly including a positive electrode, a negative electrode, and separator between the positive electrode and the negative electrode;
a thermally conductive resin in the hollow, and
wherein the thermally conductive resin is a polymer comprising urethane or silicon as a base material and alumina or boron nitride as an auxiliary material.

16. The secondary battery of claim 15, further comprising a metal rod having a first end thereof in the hollow to be in contact with the thermally conductive resin and a second end thereof extending to an outside of the hollow.

17. The secondary battery of claim 15, further comprising a top cover on an upper end portion of the can main body and configured to seal the upper end of the can main body.

18. The secondary battery of claim 15, wherein at least 50% of a total volume of the hollow is filled with the thermally conductive resin.

19. The secondary battery of claim 15, wherein the hollow is configured to be in communication with an exterior of the secondary battery at one of a upper end and a lower end of the hollow.

* * * * *